(12) United States Patent
Rydenhag et al.

(10) Patent No.: US 9,207,860 B2
(45) Date of Patent: Dec. 8, 2015

(54) METHOD AND APPARATUS FOR DETECTING A GESTURE

(75) Inventors: Daniel Tobias Rydenhag, Gothenburg (SE); Per Åke Daniel Johansson, Malmö (SE); Nils Roger Andersson Reimer, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 259 days.

(21) Appl. No.: 13/481,171

(22) Filed: May 25, 2012

(65) Prior Publication Data

US 2013/0314331 A1    Nov. 28, 2013

(51) Int. Cl.
  *G06F 3/0488*  (2013.01)
  *G06F 3/01*    (2006.01)
  *G06F 3/0484*  (2013.01)
  *G06F 3/041*   (2006.01)

(52) U.S. Cl.
  CPC ............ *G06F 3/04883* (2013.01); *G06F 3/017* (2013.01); *G06F 3/041* (2013.01); *G06F 3/0484* (2013.01); *G06F 3/04847* (2013.01)

(58) Field of Classification Search
  USPC .................................................. 345/156, 173
  See application file for complete search history.

(56) References Cited

U.S. PATENT DOCUMENTS

| | | | |
|---|---|---|---|
| 3,872,433 A | 3/1975 | Holmes et al. | |
| 4,408,302 A | 10/1983 | Fessel et al. | |
| 5,261,009 A | 11/1993 | Bokser | |
| 5,664,127 A | 9/1997 | Anderson et al. | |
| 5,832,528 A | 11/1998 | Kwatinetz et al. | |
| 5,963,671 A | 10/1999 | Comerford et al. | |
| 6,002,390 A | 12/1999 | Masui | |
| 6,064,340 A | 5/2000 | Martin et al. | |
| 6,094,197 A | 7/2000 | Buxton et al. | |
| 6,223,059 B1 | 4/2001 | Haestrup | |
| 6,226,299 B1 | 5/2001 | Henson | |
| 6,351,634 B1 | 2/2002 | Shin | |
| 6,421,453 B1 | 7/2002 | Kanevsky et al. | |
| 6,573,844 B1 | 6/2003 | Venolia et al. | |
| 6,621,424 B1 | 9/2003 | Brand | |
| 6,646,572 B1 | 11/2003 | Brand | |
| 6,801,190 B1 | 10/2004 | Robinson et al. | |
| 7,061,403 B2 | 6/2006 | Fux | |

(Continued)

FOREIGN PATENT DOCUMENTS

CA    2688204 A1    7/2010
CA    2812457 A1    10/2013

(Continued)

OTHER PUBLICATIONS

"Features Included in the T-Mobile G1", http://www.t-mobileg1.com/T-Mobile-G1-Features.pdf, 2009.

(Continued)

*Primary Examiner* — Jason Olson
*Assistant Examiner* — Sosina Abebe
(74) *Attorney, Agent, or Firm* — Fish & Richardson P.C.

(57) ABSTRACT

A method includes detecting a swipe gesture from an initial touch location on a touch-sensitive display of an electronic device; determining touch attributes for the swipe gesture; and performing a lock function if the touch attributes correspond to a stored swipe gesture associated with the lock function. Further lock functions may be activated by detection of attributes of a further stored swipe gesture.

45 Claims, 4 Drawing Sheets

(56) References Cited

U.S. PATENT DOCUMENTS

| | | | |
|---|---|---|---|
| 7,098,896 B2 | 8/2006 | Kushler et al. |
| 7,107,204 B1 | 9/2006 | Liu et al. |
| 7,216,588 B2 | 5/2007 | Suess |
| 7,259,752 B1 | 8/2007 | Simmons |
| 7,277,088 B2 | 10/2007 | Robinson et al. |
| 7,292,226 B2 | 11/2007 | Matsuura et al. |
| 7,382,358 B2 | 6/2008 | Kushler et al. |
| 7,394,346 B2 | 7/2008 | Bodin |
| 7,443,316 B2 | 10/2008 | Lim |
| 7,479,949 B2 | 1/2009 | Jobs et al. |
| 7,487,461 B2 | 2/2009 | Zhai et al. |
| 7,526,316 B2 | 4/2009 | Shimizu |
| 7,530,031 B2 | 5/2009 | Iwamura et al. |
| 7,661,068 B2 | 2/2010 | Lund |
| 7,671,765 B2 | 3/2010 | Fux |
| 7,698,127 B2 | 4/2010 | Trower, II et al. |
| 7,886,233 B2 | 2/2011 | Rainisto et al. |
| 7,934,156 B2 | 4/2011 | Forstall et al. |
| 8,023,930 B2 | 9/2011 | Won |
| 8,059,101 B2 | 11/2011 | Westerman et al. |
| 8,065,624 B2 | 11/2011 | Morin et al. |
| 8,201,087 B2 | 6/2012 | Kay et al. |
| 8,225,203 B2 | 7/2012 | Unruh |
| 8,289,283 B2 | 10/2012 | Kida et al. |
| 8,326,358 B2 | 12/2012 | Runstedler et al. |
| 8,490,008 B2 | 7/2013 | Griffin et al. |
| 8,516,386 B2 | 8/2013 | Adam et al. |
| 8,542,206 B2 | 9/2013 | Westerman et al. |
| 2002/0080186 A1 | 6/2002 | Frederiksen |
| 2002/0097270 A1 | 7/2002 | Keely et al. |
| 2002/0154037 A1 | 10/2002 | Houston |
| 2002/0180797 A1 | 12/2002 | Bachmann |
| 2004/0111475 A1 | 6/2004 | Schultz |
| 2004/0135818 A1 | 7/2004 | Thomson et al. |
| 2004/0140956 A1 | 7/2004 | Kushler et al. |
| 2004/0153963 A1 | 8/2004 | Simpson et al. |
| 2004/0201576 A1 | 10/2004 | Shimada et al. |
| 2005/0017954 A1 | 1/2005 | Kay et al. |
| 2005/0024341 A1 | 2/2005 | Gillespie et al. |
| 2005/0039137 A1 | 2/2005 | Bellwood et al. |
| 2005/0052425 A1 | 3/2005 | Zadesky et al. |
| 2005/0093826 A1 | 5/2005 | Huh |
| 2005/0162407 A1 | 7/2005 | Sakurai et al. |
| 2005/0195173 A1 | 9/2005 | McKay |
| 2005/0244208 A1 | 11/2005 | Suess |
| 2005/0275632 A1 | 12/2005 | Pu et al. |
| 2006/0022947 A1 | 2/2006 | Griffin et al. |
| 2006/0026521 A1 | 2/2006 | Hotelling et al. |
| 2006/0033724 A1 | 2/2006 | Chaudhri et al. |
| 2006/0053387 A1 | 3/2006 | Ording |
| 2006/0176283 A1 | 8/2006 | Suraqui |
| 2006/0209040 A1 | 9/2006 | Garside et al. |
| 2006/0239562 A1 | 10/2006 | Bhattacharyay et al. |
| 2006/0253793 A1 | 11/2006 | Zhai et al. |
| 2006/0265648 A1 | 11/2006 | Rainisto et al. |
| 2006/0265668 A1 | 11/2006 | Rainisto |
| 2006/0279548 A1 | 12/2006 | Geaghan |
| 2007/0015534 A1 | 1/2007 | Shimizu |
| 2007/0046641 A1 | 3/2007 | Lim |
| 2007/0061753 A1 | 3/2007 | Ng et al. |
| 2007/0150842 A1 | 6/2007 | Chaudhri et al. |
| 2007/0156394 A1 | 7/2007 | Banerjee et al. |
| 2007/0157085 A1 | 7/2007 | Peters |
| 2007/0229476 A1 | 10/2007 | Huh |
| 2007/0256029 A1 | 11/2007 | Maxwell |
| 2007/0263932 A1 | 11/2007 | Bernardin et al. |
| 2008/0033713 A1 | 2/2008 | Brostrom |
| 2008/0100581 A1 | 5/2008 | Fux |
| 2008/0122796 A1 | 5/2008 | Jobs et al. |
| 2008/0126387 A1 | 5/2008 | Blinnikka |
| 2008/0136587 A1 | 6/2008 | Orr |
| 2008/0141125 A1 | 6/2008 | Ghassabian |
| 2008/0158020 A1 | 7/2008 | Griffin |
| 2008/0168366 A1 | 7/2008 | Kocienda et al. |
| 2008/0184360 A1 | 7/2008 | Kornilovsky et al. |
| 2008/0189605 A1 | 8/2008 | Kay et al. |
| 2008/0195388 A1 | 8/2008 | Bower et al. |
| 2008/0231610 A1 | 9/2008 | Hotelling et al. |
| 2008/0259040 A1 | 10/2008 | Ording et al. |
| 2008/0266261 A1 | 10/2008 | Idzik |
| 2008/0273013 A1 | 11/2008 | Levine et al. |
| 2008/0281583 A1 | 11/2008 | Slothouber et al. |
| 2008/0304890 A1 | 12/2008 | Shin et al. |
| 2008/0309644 A1 | 12/2008 | Arimoto |
| 2008/0316183 A1* | 12/2008 | Westerman et al. ......... 345/173 |
| 2008/0318635 A1 | 12/2008 | Yoon et al. |
| 2009/0002326 A1 | 1/2009 | Pihlaja |
| 2009/0006991 A1 | 1/2009 | Lindberg et al. |
| 2009/0025089 A1 | 1/2009 | Martin et al. |
| 2009/0058823 A1 | 3/2009 | Kocienda |
| 2009/0058830 A1 | 3/2009 | Herz et al. |
| 2009/0066668 A1 | 3/2009 | Kim et al. |
| 2009/0077464 A1 | 3/2009 | Goldsmith et al. |
| 2009/0085881 A1 | 4/2009 | Keam |
| 2009/0094562 A1* | 4/2009 | Jeong et al. .................. 715/863 |
| 2009/0125848 A1 | 5/2009 | Keohane et al. |
| 2009/0132576 A1 | 5/2009 | Miller et al. |
| 2009/0144667 A1 | 6/2009 | Christoffersson et al. |
| 2009/0150785 A1 | 6/2009 | Asami et al. |
| 2009/0160800 A1 | 6/2009 | Liu et al. |
| 2009/0167700 A1 | 7/2009 | Westerman et al. |
| 2009/0174667 A1 | 7/2009 | Kocienda et al. |
| 2009/0193334 A1 | 7/2009 | Assadollahi |
| 2009/0213081 A1 | 8/2009 | Case, Jr. |
| 2009/0228792 A1 | 9/2009 | Van Os et al. |
| 2009/0228842 A1 | 9/2009 | Westerman et al. |
| 2009/0237361 A1 | 9/2009 | Mosby et al. |
| 2009/0247112 A1 | 10/2009 | Lundy et al. |
| 2009/0251410 A1 | 10/2009 | Mori et al. |
| 2009/0254818 A1 | 10/2009 | Jania et al. |
| 2009/0259962 A1 | 10/2009 | Beale |
| 2009/0265669 A1 | 10/2009 | Kida et al. |
| 2009/0267909 A1* | 10/2009 | Chen et al. ................... 345/173 |
| 2009/0284471 A1 | 11/2009 | Longe et al. |
| 2009/0295737 A1 | 12/2009 | Goldsmith et al. |
| 2009/0307768 A1 | 12/2009 | Zhang et al. |
| 2009/0313693 A1 | 12/2009 | Rogers |
| 2010/0020033 A1 | 1/2010 | Nwosu |
| 2010/0020036 A1 | 1/2010 | Hui et al. |
| 2010/0026650 A1 | 2/2010 | Srivastava et al. |
| 2010/0045705 A1 | 2/2010 | Vertegaal et al. |
| 2010/0050121 A1 | 2/2010 | Shin |
| 2010/0052880 A1 | 3/2010 | Laitinen |
| 2010/0070908 A1 | 3/2010 | Mori et al. |
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1 | 6/2010 | Duarte et al. |
| 2010/0156818 A1 | 6/2010 | Burrough et al. |
| 2010/0161538 A1 | 6/2010 | Kennedy, Jr. et al. |
| 2010/0197352 A1 | 8/2010 | Runstedler et al. |
| 2010/0199176 A1 | 8/2010 | Chronqvist |
| 2010/0225599 A1 | 9/2010 | Danielsson et al. |
| 2010/0235726 A1 | 9/2010 | Ording et al. |
| 2010/0253620 A1 | 10/2010 | Singhal |
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |
| 2010/0269040 A1* | 10/2010 | Lee ............................... 715/702 |
| 2010/0277424 A1 | 11/2010 | Chang et al. |
| 2010/0287486 A1 | 11/2010 | Coddington |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |

(56) References Cited

U.S. PATENT DOCUMENTS

| | | |
|---|---|---|
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0105193 A1* | 5/2011 | Lee et al. ............... 455/566 |
| 2011/0119623 A1 | 5/2011 | Kim |
| 2011/0130170 A1* | 6/2011 | Han et al. ............... 455/566 |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0201387 A1 | 8/2011 | Paek et al. |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1 | 11/2011 | Yaksick et al. |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1* | 4/2012 | Wilairat ............... 715/863 |
| 2012/0092278 A1 | 4/2012 | Yamano |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0144330 A1* | 6/2012 | Flint ............... 715/765 |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0174042 A1* | 7/2012 | Chang ............... 715/863 |
| 2012/0200514 A1* | 8/2012 | Allen ............... 345/173 |
| 2012/0223959 A1 | 9/2012 | Lengeling |
| 2012/0284673 A1* | 11/2012 | Lamb et al. ............... 715/863 |
| 2012/0284789 A1* | 11/2012 | Kim et al. ............... 726/19 |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0061317 A1 | 3/2013 | Runstedler et al. |
| 2013/0063356 A1 | 3/2013 | Martisauskas |
| 2013/0067411 A1 | 3/2013 | Kataoka et al. |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0246329 A1 | 9/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285916 A1 | 10/2013 | Griffin et al. |
| 2013/0314331 A1 | 11/2013 | Rydenhag et al. |
| 2013/0342452 A1 | 12/2013 | Kuo et al. |
| 2014/0002363 A1 | 1/2014 | Griffin et al. |
| 2014/0062886 A1 | 3/2014 | Pasquero et al. |
| 2014/0062923 A1 | 3/2014 | Thorsander et al. |
| 2014/0063067 A1 | 3/2014 | Compton et al. |
| 2014/0067372 A1 | 3/2014 | Pasquero et al. |

FOREIGN PATENT DOCUMENTS

| | | |
|---|---|---|
| CA | 2813393 A1 | 10/2013 |
| CA | 2819839 A1 | 12/2013 |
| CA | 2820997 A1 | 1/2014 |
| CN | 101021762 A | 8/2007 |
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2386976 A1 | 11/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |
| EP | 2653955 A1 | 10/2013 |
| EP | 2660696 A1 | 11/2013 |
| EP | 2660697 A1 | 11/2013 |
| EP | 2660699 A1 | 11/2013 |
| EP | 2660727 A1 | 11/2013 |
| EP | 2703955 A1 | 3/2014 |
| EP | 2703956 A1 | 3/2014 |
| EP | 2703957 A1 | 3/2014 |
| JP | 2011-197782 A | 10/2011 |
| JP | 2012-68963 A | 4/2012 |
| KP | KR20120030652 A | 3/2012 |
| WO | 03/029950 A2 | 4/2003 |
| WO | 03/054681 A1 | 7/2003 |
| WO | 2004/001560 A1 | 12/2003 |
| WO | 2005/064587 A2 | 7/2005 |
| WO | 2006/100509 A2 | 9/2006 |
| WO | 2007/068505 A1 | 6/2007 |
| WO | 2007/076210 A1 | 7/2007 |
| WO | 2007/134433 A1 | 11/2007 |
| WO | WO2008/030974 | 3/2008 |
| WO | WO2008/057785 A2 | 5/2008 |
| WO | WO2008/085741 A2 | 7/2008 |
| WO | 2009/019546 A2 | 2/2009 |

(56) References Cited

FOREIGN PATENT DOCUMENTS

| WO | 2010/035574 A1 | 4/2010 |
|---|---|---|
| WO | 2010/035585 A1 | 4/2010 |
| WO | WO2010/035574 A1 | 4/2010 |
| WO | WO2010/099835 A1 | 9/2010 |
| WO | WO2010/112841 A1 | 10/2010 |
| WO | 2011/073992 A2 | 6/2011 |
| WO | WO2011/073992 A2 | 6/2011 |
| WO | 2011/098925 A1 | 8/2011 |
| WO | WO2011/113057 A1 | 9/2011 |
| WO | 2012/043932 A1 | 4/2012 |
| WO | 2013/163718 A1 | 11/2013 |
| WO | 2013/164013 A1 | 11/2013 |

OTHER PUBLICATIONS

BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
Conveniently select text, images, annotations, etc. In a PDF or any other text format on a touch based mobile/tablet device, IP.com Journal, Mar. 1, 2011, XP013142665, (10 pages).
DROID X by Motorola © 2010 Screen shots.
DROID X by Motorola © 2010 User Manual (72 pages).
European Search Report dated Feb. 28, 2011, issued in European Patent Application No. 10160590.5.
Extended European Search Report dated Aug. 24, 2012, issued in European Application No. 12166115.1 (5 pages).
Extended European Search Report dated Aug. 31, 2012, issued in European Application No. 12166170.6 (7 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 3, 2012, issued in European Application No. 12164300.1 (7 pages).
Google Mobile Help—Editing text, http://support.google.com/mobile/bin/answer.py?hl=en&answer=168926, date of access: Jun. 6, 2012 (2 pages).
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
International Search Report and Written Opinion issued in International Application No. PCT/EP2012/057944, on Oct. 12, 2012, (10 pages).
International Search Report and Written Opinion issued in International Application No. PCT/IB2011/003273, on Jun. 14, 2012, (8 pages).
International Search Report and Written Opinion mailed Sep. 10, 2012, issued for International Application No. PCT/EP2012/057945 (11 pages).
iPhone User Guide—For iPhone OS 3.1 Software, 2009 (217 pages).
Madhvanath, Sriganesh, HP-Gesture based computing interfaces, Mar. 2008.
Manual del usuario Samsung Moment • with Google • dated May 20, 2012 (224 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).

Mobile Tech News—Samsung launches new Gesture Lock touchscreen handsets, http://www.mobiletechnews.com/info/2009/03/11/124559.html, Mar. 11, 2009.
Partial European Search Report; Application No. 10160590.5; Sep. 16, 2010.
Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://supportsprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Office Action dated Oct. 15, 2012, issued in U.S. Appl. No. 13/560,270 (15 pages).
U.S. Office Action dated Oct. 17, 2012, issued in U.S. Appl. No. 13/563,943 (17 pages).
U.S. Office Action dated Oct. 18, 2012, issued in U.S. Appl. No. 13/563,182 (12 pages).
U.S. Office Action dated Oct. 23, 2012, issued in U.S. Appl. No. 12/764,298 (41 pages).
U.S. Office Action dated Oct. 25, 2012, issued in U.S. Appl. No. 13/459,732 (15 pages).
U.S. Office Action dated Oct. 5, 2012, issued in U.S. Appl. No. 13/447,835 (20 pages).
U.S. Office Action dated Sep. 10, 2012, issued in U.S. Appl. No. 13/524,678 (12 pages).
U.S. Office Action dated Sep. 28, 2012, issued in U.S. Appl. No. 13/494,794 (14 pages).
U.S. Office Action for U.S. Appl. No. 12/764,298, dated Jul. 20, 2012, (38 pages).
U.S. Office Action for U.S. Appl. No. 13/482,705, dated Aug. 7, 2012, (10 pages).
User Guide Samsung Moment(TM) with Google(TM), dated Dec. 4, 2009 (122 pages).
User Guide Samsung Moment(TM) with Google(TM), dated Mar. 2, 2010 (218 pages).
"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
Canadian Office Action dated Aug. 8, 2012, issued in Canadian Application No. 2,688,204 (3 pages).
Canadian Office Action dated Mar. 27, 2013, issued in Canadian Application No. 2,737,314 (3 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
European Examination Report dated Apr. 5, 2013, issued in European Application No. 12180190.6 (7 pages).
European Partial Search Report dated Jan. 16, 2013, issued in European Application No. 12182612.7 (5 pages).
European Partial Search Report dated Mar. 7, 2013, issued in European Application No. 12184574.7 (5 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Feb. 28, 2013, issued in European Application No. 12182610.1 (7 pages).

(56) References Cited

OTHER PUBLICATIONS

Extended European Search Report dated Jan. 25, 2013, issued in European Application No. 12166520.2 (8 pages).
Extended European Search Report dated Jun. 26, 2013, issued in European Application No. 12184574.7 (10 pages).
Extended European Search Report dated Mar. 8, 2013, issued in European Application No. 12182611.9 (8 pages).
Extended European Search Report dated May 6, 2009, issued in European Application No. 09151723.5 (7 pages).
Extended European Search Report dated Nov. 22, 2012, issued in European Application No. 12172892.7 (7 pages).
Extended European Search Report dated Nov. 28, 2011, issued in European Application No. 11180985.1 (4 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Jul. 9, 2013, issued in U.S. Appl. No. 13/564,070 (26 pages).
Final Office Action dated Jul. 25, 2013, issued in U.S. Appl. No. 13/560,796 (19 pages).
Final Office Action dated Jul. 30, 2013, issued in U.S. Appl. No. 13/459,301 (27 pages).
Final Office Action dated Mar. 15, 2013, issued in U.S. Appl. No. 13/572,232 (36 pages).
Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
Notice of Allowance dated Mar. 15, 2013, issued in U.S. Appl. No. 13/373,356 (25 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Jun. 8, 2011, issued in U.S. Appl. No. 12/362,536 (19 pages).
Office Action dated Mar. 12, 2013, issued in U.S. Appl. No. 13/560,796 (22 pages).
Office Action dated May 30, 2013, issued in U.S. Appl. No. 13/572,232 (49 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 26, 2012, issued in U.S. Appl. No. 13/554,436 (22 pages).
PCT International Search Report and Written Opinion dated Jan. 24, 2013, issued in International Application No. PCT/CA2012/050274 (9 pages).
PCT International Search Report and Written Opinion dated Nov. 7, 2012, issued in International Application No. PCT/CA2012/050362 (9 pages).
PCT International Search Report and Written Opinion dated Nov. 8, 2012, issued in International Application No. PCT/CA2012/050405 (12 pages).
Swype Product Features, accessed online at http://www.swype.com/about/specifications/ on Feb. 25, 2013 (2 pages).
Through the Magic Window—Magic Window word processor for the Apple II, Artsci Publishing, 1980, http://www.artscipub.com/history/magicwindow, accessed May 21, 2013 (5 pages).
U.S. Appl. No. 13/601,736, filed Aug. 31, 2012 (44 pages).
U.S. Appl. No. 13/616,423, filed Sep. 14, 2012 (30 pages).
U.S. Appl. No. 13/773,812, filed Feb. 22, 2013 (94 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Office Action issued in EP 12169649.6 dated Mar. 12, 2014.
Enable or Disable SureType with a RIM BlackBerry Pearl Using Handheld Software, version 4.x, "http://www.wireless.att.com/support_static_files/KB/KB72601.html", at least as early as Feb. 8, 2008 (3 pages).
European Examination Report dated Aug. 22, 2013, issued in European Application No. 12166520.2, (4 pages).
European Examination Report dated Aug. 22, 2013, issued in European Application No. 12173818.1, (6 pages).
European Examination Report dated Dec. 9, 2013, issued in European Application No. 12172458.7 (4 pages).
Extended European Search Report dated Dec. 21, 2012, issued in European Application No. 12173818.1, (8 pages).
Final Office Action dated Dec. 13, 2013, issued in U.S. Appl. No. 13/572,232, (30 pages).
Final Office Action dated Feb. 10, 2014, issued in U.S. Appl. No. 13/485,723, (19 pages).
Notice of Allowance dated Aug. 12, 2013, issued in U.S. Appl. No. 13/564,687, (10 pages).
Notice of Allowance mailed Oct. 11, 2013, issued in U.S. Appl. No. 13/563,943, (20 pages).
Office Action dated Dec. 6, 2013, issued in U.S. Appl. No. 13/564,697, (22 pages).
Office Action dated Jan. 31, 2014, issued in U.S. Appl. No. 13/534,101, (38 pages).
Office Action dated Mar. 12, 2014, issued in U.S. Appl. No. 13/616,423, (21 pages).
Office Action dated Nov. 22, 2013, issued in U.S. Appl. No. 13/447,704, (47 pages).
Office Action dated Oct. 17, 2013, issued in U.S. Appl. No. 13/485,723, (28 pages).
Touchpal (combination of two sources: first, youtube video on touchpal at url: http://www.youtube.com/watch?v=eJUWFEXxJal, dated on Dec. 1, 2011, with screen captures shown below; second, TimesofIndia website article on touchpal at url: http://articles.timesofindia.indiatimes.com/2012-01-29/computing/30673975_1_swype-android-market-qwerty).
U.S. Appl. No. 13/459,301, filed Apr. 30, 2012, (87 pages).
U.S. Appl. No. 13/459,716, filed Apr. 30, 2012, (63 pages).
U.S. Appl. No. 13/459,761, filed Apr. 30, 2012, (35 pages).
U.S. Appl. No. 13/459,872, filed Apr. 30, 2012, (35 pages).
U.S. Appl. No. 13/459,980, filed Apr. 30, 2012, (35 pages).
U.S. Appl. No. 13/525,576, filed Jun. 18, 2012, (87 pages).
U.S. Appl. No. 13/529,182, filed Jun. 21, 2012, (24 pages).
U.S. Appl. No. 13/534,101, filed Jun. 27, 2012, (85 pages).
U.S. Appl. No. 13/601,864, filed Aug. 31, 2012, (23 pages).
U.S. Appl. No. 13/601,898, filed Aug. 31, 2012, (28 pages).

(56) References Cited

OTHER PUBLICATIONS

Canadian Office Action dated Jun. 12, 2014, issued in Canadian Application No. 2,818,720, (3 pages).
Canadian Office Action dated Jun. 12, 2014, issued in Canadian Application No. 2,821,772, (2 pages).
Canadian Office Action dated Jun. 19, 2014, issued in Canadian Application No. 2,821,814, (3 pages).
Canadian Office Action dated Jun. 2, 2014, issued in Canadian Application No. 2,812,033, (3 pages).
Canadian Office Action dated Jun. 25, 2014, issued in Canadian Application No. 2,812,457, (5 pages).
Canadian Office Action dated Jun. 30, 2014, issued in Canadian Application No. 2,819,839, (3 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Jun. 2, 2014, issued in European Application No. 12166142.5, (4 pages).
European Examination Report dated Jun. 3, 2014, issued in European Application No. 12172458.7, (5 pages).
Final Office Action dated Apr. 11, 2014, issued in U.S. Appl. No. 13/447,704, (18 pages).
Final Office Action dated Jul. 2, 2014, issued in U.S. Appl. No. 13/534,101, (20 pages).
Final Office Action dated Mar. 26, 2014, issued in U.S. Appl. No. 13/564,697, (9 pages).
Office Action dated Apr. 11, 2014, issued in U.S. Appl. No. 13/572,232, (38 pages).
Office Action dated Apr. 18, 2014, issued in U.S. Appl. No. 13/524,678, (29 pages).
Office Action dated Apr. 21, 2014, issued in U.S. Appl. No. 13/601,736, (33 pages).
Office Action dated Jun. 11, 2014, issued in U.S. Appl. No. 13/563,182, (12 pages).
Office Action dated Jun. 18, 2014, issued in U.S. Appl. No. 13/601,898, (27 pages).
Office Action dated Mar. 14, 2014, issued in U.S. Appl. No. 13/569,000, (25 pages).
Office Action dated Mar. 26, 2014, issued in U.S. Appl. No. 13/548,469, (46 pages).
Office Action dated May 15, 2014, issued in U.S. Appl. No. 13/482,705, (19 pages).
Office Action dated May 2, 2014, issued in U.S. Appl. No. 13/459,301, (25 pages).
Office Action dated May 21, 2014, issued in U.S. Appl. No. 13/485,723, (18 pages).
Canadian Office Action in Canadian Application No. 2,816,754, dated Jan. 27, 2015, 3 pages.

* cited by examiner

METHOD AND APPARATUS FOR DETECTING A GESTURE

FIELD OF THE TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11[1] or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified based on the functions and operations being performed.

DETAILED DESCRIPTION

The following describes an apparatus for and method of locking a device based on input received from a touch-sensitive display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non-portable electronic devices include desktop computers, electronic white boards, smart boards utilized for collaboration, built-in monitors or displays in furniture or appliances, monitors, displays, televisions and so forth.

Figure 1:
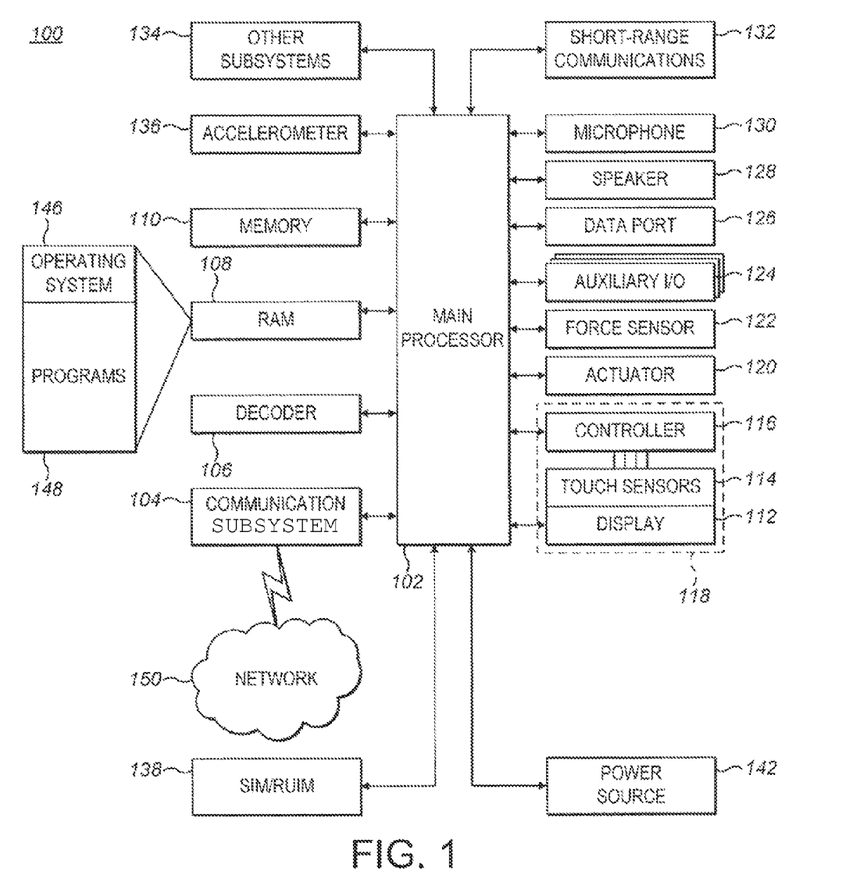
FIG. 1 is a block diagram of a portable electronic device in accordance with the disclosure.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 may be decompressed and decrypted by a decoder 106. The communication subsystem 104 receives messages from and sends messages to a wireless network 150. The wireless network 150 may comprise any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on an electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module, a Removable User Identity Module (SIM/RUIM) card 138, or alternatively a Universal Integrated Circuit Card (UICC) or an embedded Universal Integrated Circuit Card (eUICC), for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134. Short-range communications subsystem 132 may include any or all of Bluetooth®, Radio-frequency identification (RFID) & near field communications (NFC) technologies. The electronic device may, therefore, in at least some example embodiments, include a near field communications (NFC) subsystem. The NFC subsystem is configured to communicate with other electronic devices and/or tags, using an NFC communications protocol. NFC is a set of short-range wireless technologies which typically require a distance of 4 cm or less for communications. The NFC subsystem may include an NFC chip and an NFC antenna. In at least some example embodiments, the short-range communication subsystem may be a wireless bus protocol compliant communication mechanism such as a Bluetooth® communication module or a Wi-Fi module to provide for communication with similarly-enabled systems and devices. Any one, any combination, or all of these wireless communications technologies may be included in communications sub-system 104, or short-range communications subsystem 132.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may comprise any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus (active or passive), pen, or other pointer, based on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
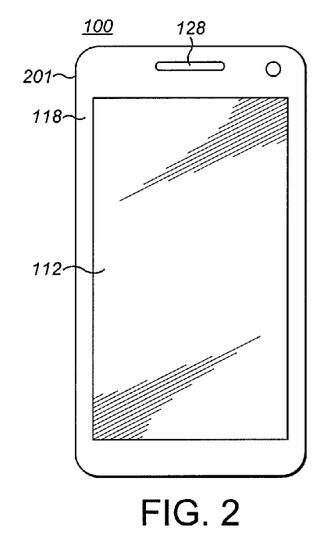
FIG. 2 is a front view of an example of a smartphone in accordance with the disclosure.
Figure 3:
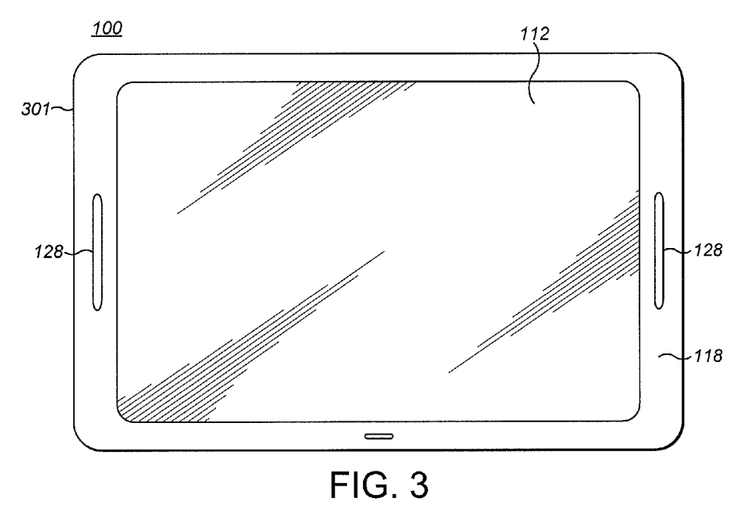
FIG. 3 is a front view of an example of a tablet computer in accordance with the disclosure.

A front view of an example electronic device 100 that is a portable electronic device 201 is illustrated in FIG. 2. A front view of an example electronic device 100 that is a tablet computer 301 is illustrated in FIG. 3.

Touch sensors 114 detect touch input, thus providing the device 100 with an interface to identify gestures based on detected touch locations, series of consecutive touch locations and swipe gestures having certain attributes as described above. The resolution of the touch sensors 114 in electronic devices 100 may be an imprecise indication of the actual location of the touch. The touch location has an associated amount of uncertainty, for example approximately 1 mm to approximately 9 mm based on the spacing of touch sensors 114 and other factors.

Figure 4:
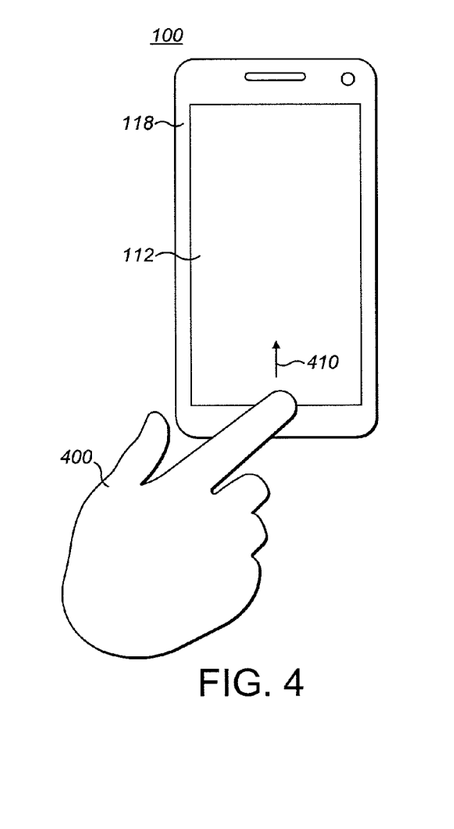
FIG. 4 illustrates an example of touch attributes of a swipe gesture in accordance with the disclosure.

FIG. 4 shows a device 100 to which a gesture is applied by a user 400. An example of a method according to the invention will now be described in relation to FIGS. 4 to 6. FIG. 4 shows a user 400 applying a swipe gesture from an initial touch location. In the illustrated case, the initial touch location is at a perimeter of the touch sensitive display 118. Touch sensitive display 118 may comprise a display 112 and the touch sensitive area 118 may further extend outside of the display 112. Further, the touch sensitive area may be provided on a separate part of device 100 adjacent the display 112. For the purposes of this disclosure, a touch sensitive display 118 includes any touch sensitive area substantially adjacent display 112. On detection of a gesture beginning at an initial touch location, device 100 determines touch attributes of the gesture. These touch attributes can include the initial touch location, along with any other touch attributes discussed above. In the illustrated example, device 100 compares touch attributes of the detected gesture with touch attributes of a stored gesture. The stored gesture may be associated with a lock function of the device 100. The stored touch attributes may include an initial touch location on the touch sensitive display 118. The stored initial touch location may be defined at any point on touch sensitive display 118 of device 100. In one embodiment, the stored initial touch location may be defined as a touch location at, or adjacent to, a perimeter of the touch sensitive display, as illustrated in FIG. 4. The touch attributes for the stored gesture may include a second touch location. The second touch location may be defined as a point at a predefined distance from the initial touch location. The predefined distance may be a distance along a certain predefined axis of the display, or may be a predefined distance having a predefined magnitude in any direction on the display. Further, as in the example of FIG. 4, the gesture may begin at the initial touch location of the gesture made by the user 400 and progress away from the initial touch location, for example, in a direction of arrow 410. A threshold value of any other suitable touch attribute may alternatively or additionally be used to define the stored gesture. Although in the example described, the swipe gesture is illustrated as having a generally upward direction beginning at an example initial location at or adjacent to the lower perimeter of the device, other directions and other initial locations may be used.

Figure 5:
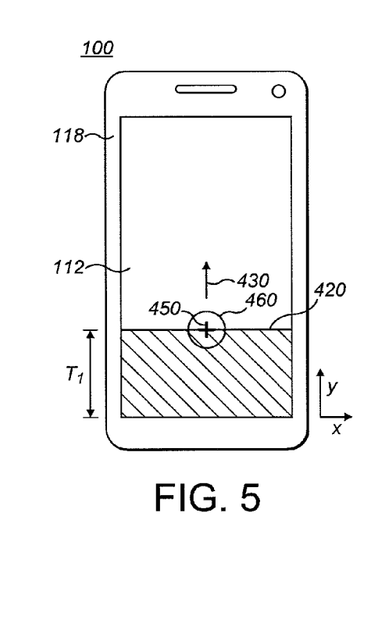
FIG. 5 illustrates a further example of touch attributes of a swipe gesture in accordance with the disclosure.

FIG. 5 illustrates an example where the gesture includes a swipe from the touch location of FIG. 4 to that illustrated by touch location 450 and/or touch area 460. Touch attributes of the gesture may therefore be the initial location shown in FIG. 4 and the further touch location 450 illustrated in FIG. 5.

FIG. 5 shows a touch location 450 and a corresponding touch area 460. A touch area 460 may compensate for inherent imprecision of determination of a touch location 450.

The touch area 460 may be derived from touch data received from the touch sensors 114 for a detected touch. A touch area 460 may alternatively be a virtual area around the touch location 450, such as the touch area 460.

The size of the virtual touch area 460 may be based on known characteristics, e.g., uncertainties and inaccuracies, of the touch sensors 114. For example, when the resolution for a touch location 450 is 6 mm, the device 100 may generate a 6 mm radius virtual touch area 460 around a touch location to compensate.

Although a circle is utilized for the touch area 460 in the examples herein, other shapes may be utilized. For example, a custom shape that more accurately represents the contact shape of a finger or stylus touching a touch-sensitive display may be utilized. Other input data may determine the shape or size of the touch area 460. For example, the shape of the touch area 460 may be angled based on orientation information received from the accelerometer 136 because the orientation of the device 100 may affect the angle of contact with the touch-sensitive display 118.

For example, in FIG. 4, a touch location 450 is detected and an associated circular touch area 460 is generated. When the touch location 450 changes to another location, information may be provided as to the angle of the touch input. Adjusting for the angle may reduce uncertainty of touch location perpendicular to direction of change of location of the touch. The touch area may optionally be updated to reflect the direction of change.

An attribute of the stored gesture may be a threshold value $T_1$. In the illustrated example, $T_1$ is defined as a threshold value in the direction of a Y-axis of display 100 and the threshold is therefore illustrated as a straight line 420 across the touch sensitive display 118 of device 100. Therefore, if the gesture includes a second touch location beyond threshold $T_1$, then a process in the device may compare these touch attributes and decide that the touch attributes correspond to a stored swipe gesture. This swipe gesture may be associated with a lock function of the device 100. Therefore, a swipe gesture from an initial touch location illustrated in FIG. 4, to a further touch location, beyond a threshold value $T_1$ from the initial touch location, can activate a lock function of the device 100.

It may be desirable to allow a user to activate a plurality of different lock functions of device 100, depending upon touch attributes relating to a distance between an initial touch location of the gesture and a further touch location of the gesture. In this way, device 100 may select one of a plurality of lock functions depending upon the distance of a touch location of the gesture from the initial touch location of the gesture. In this way, device 100 may activate a first lock function after the gesture passes threshold $T_1$. However, the user may continue the gesture beyond threshold $T_1$ in the direction of arrow 430 and a further lock function may be activated when a touch location of the gesture exceeds a second threshold, such as $T_2$ shown in FIG. 6.

Figure 6:
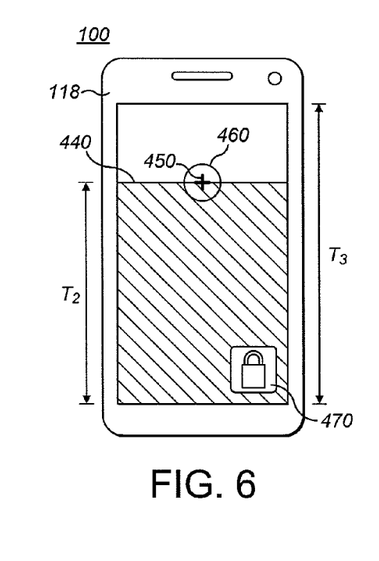
FIG. 6 illustrates a further example of touch attributes of a swipe gesture in accordance with the disclosure.

FIG. 6 illustrates further threshold $T_2$, which may be a further distance from the initial touch location illustrated in FIG. 4. Here, the threshold $T_2$ is illustrated by a straight line 440 across touch sensitive display 118. Threshold $T_2$ may however be defined as a magnitude of a distance between an initial touch location and a further touch location of the gesture, by a total distance along a path followed by the gesture or by a threshold value of any other suitable touch attribute. In general, the further threshold $T_2$ may be any touch attribute having a magnitude greater than threshold $T_1$. Upon detecting that a touch attribute has exceeded threshold $T_2$, the device may activate a second lock function, different from the first lock function activated after threshold $T_1$ is passed.

Device 100 may activate the relevant lock function only when a release of the gesture is detected beyond threshold $T_1$ or $T_2$. In this way, if a user continues the gesture in a reverse direction such that the threshold $T_1$ is no longer exceeded before releasing the gesture, then the device may not activate the lock function associated with threshold $T_1$. The same may apply to the threshold $T_2$.

Upon passing either of thresholds $T_1$ or $T_2$, the device may further set display 112 to display a lock function indicator 470. Lock function indicator 470 may further define a lock function touch area. Detection of a touch at the lock function touch area, defined in relation to lock function indicator 470, may activate a further lock function of the device 100. The lock function indicator 470 may only be displayed for a predetermined period and then be removed from the display, along with the lock function touch area. The lock function indicator may change appearance, or disappear, on detection of a touch at the lock function indicator.

A further threshold $T_3$ may be defined. $T_3$ may be defined as a touch location at a perimeter substantially opposite the perimeter at which an initial touch location is defined. Therefore, a gesture beginning at a first perimeter of the display 112 and ending at a second, optionally opposite, perimeter of the display 112 or 118 may cause the device 100 to initiate a locking function of the device. Further thresholds $T_n$ may be implemented to define further lock functions of the device at further thresholds $T_n$ of touch attributes of the device. As such, any number of thresholds $T_n$ may be defined as corresponding to any number of different locking functions of device 100.

Further visual indications of the device having detected the gesture as having touch attributes associated with a lock function may be implemented to give an indication to the user that a lock function may be activated upon release of the gesture. One example can be described in relation to the areas each side of line 420 in FIG. 5, or line 440 in FIG. 6. The device 100 may adjust the display 112 as the progression of the touch location 450 of the gesture is updated. The display may be updated to adjust display parameters of the part of the display between the initial touch location and the current touch location, so that the appearance of the area between the initial touch location and the current touch location is different to the area beyond the current touch location. As an example, the screen may be darkened in the area between the initial touch location and the current touch location, so that as the gesture progresses along display 112 in a y-direction, the display is progressively darkened. This can provide a clear indication to the user that the device considers a gesture associated with a lock function to have been detected. Such progressive adjustment of display properties can also help to indicate to the user when any of thresholds $T_1$, $T_2$ or $T_3$ is considered reached by the gesture as detected by device 100.

It can therefore be seen that touch attributes of a swipe gesture applied to a touch sensitive display of a device 100 can be associated with multiple lock functions and, by use of a single gesture, a user can initiate one or more lock functions in device 100 without a need for multiple touches or multiple gestures. Further touches may be provided to activate further locking function options if desired.

Locking functions may include any of the following: activating a screen lock, activating a device lock, and activating a lock of certain functionality of the device. A screen lock may comprise setting a mode of the device wherein at least some touch input from the touch sensitive display is ignored. All touch input may be ignored when a screen lock is activated, unless touch input is required to unlock the screen, in which case only certain gestures may be used to unlock the screen. This advantageously avoids inadvertent "pocket dialing" wherein an unintended phone call is made or other touch events inadvertently occur while the device is in a user's pocket or purse, etc. This advantageously further avoids the potential costs associated with an accidental phone call or other accidental action. This advantageously further avoids other undesirable consequences, such as embarrassment or breach of confidentiality resulting from a conversation that is inadvertently overheard or a message that is inadvertently forwarded as a result of accidental touch inputs. In embodiments in which the device comprises a keyboard and/or other keys or buttons, inputs such as key or button presses may be ineffective while screen lock (which may also be referred to as a keyboard lock) is active. This advantageously avoids unintentional key presses while the device is in a user's pocket or purse, etc. Certain keys or buttons may be allowed to function while the screen lock (or keyboard lock) is active, such as a key or button used to make an emergency phone call, or a key or button used to power off the device, etc. The display may further be darkened, dimmed or switched off when the screen lock is active. Darkening, dimming or switching off the display advantageously reduces power consumption and extends battery life. In some embodiments, the device may display a screensaver or status information such as the date and time, etc. while screen lock is active. The device may also enter a standby mode or low-power mode when the screen lock is activated.

Locking functions may further include activating a device lock. A device lock may do any of the following: lock one or more services of the device, prevent access to the device over certain RF or wired links such as Bluetooth or USB access, and add security measures, such as requiring a password, PIN-code, biometric data, or other authentication token for accessing the device. If a password or other token is required to unlock a locked device, the locking function may be referred to as a password lock. A device lock may be considered an extension of the screen lock function, adding additional security beyond the screen lock and so to allow the user to lock the device as an extension of a gesture used to lock the screen provides a more convenient user interface. In one example of a device lock, which may sometimes be referred to as a partial device lock, certain applications or services or other resources of the device are inaccessible, while others are accessible. In one example of a partial device lock which may sometimes be referred to as a perimeter lock, wherein a perimeter generally refers to a logical group of resources that share a common management scheme governing their use, one or more perimeters of the device are locked while one or more perimeters of the device are unlocked. A device may comprise multiple perimeters, such as a work or enterprise perimeter, and a personal or recreational perimeter. A work perimeter may comprise work-related data and applications (such as customer relationship software, enterprise collaboration software, etc.) and other resources classified as work-related, and a personal perimeter may comprise personal-related data and applications (such as social networking applications, games, etc.) and other resources classified as personal. The perimeter lock may provide for the user to lock certain functions or resources of the device, such as those associated with a work or enterprise perimeter, with a gesture having a first set of touch attributes, and lock certain other functions or resources of the device, such as those associated with a personal or recreational perimeter of the device, if the gesture has a second set of touch attributes. The ability to provide such multiple locking functions can be desirable in particular in light of the increasing use of personal devices for work functions and there is therefore an increasing need for the ability to lock certain functions of the device more quickly, more easily, or more regularly than others.

The lock function may only be recognized by the device when the home screen is displayed. The detection of the gestures described herein for locking the device may therefore be disabled when the device is not showing the home screen. This can be beneficial, since a user often returns to the home screen before locking the device. A similar gesture may be used to return to the home screen as for locking the device, which provides a simple combination of similar gestures to both return to the home screen and to lock the device. Therefore, the same detection steps described herein in relation to a lock function may be used to activate a function which returns the user to the home screen. The method steps may further be applied to other non-locking functions of the device if desired.

Figure 7:
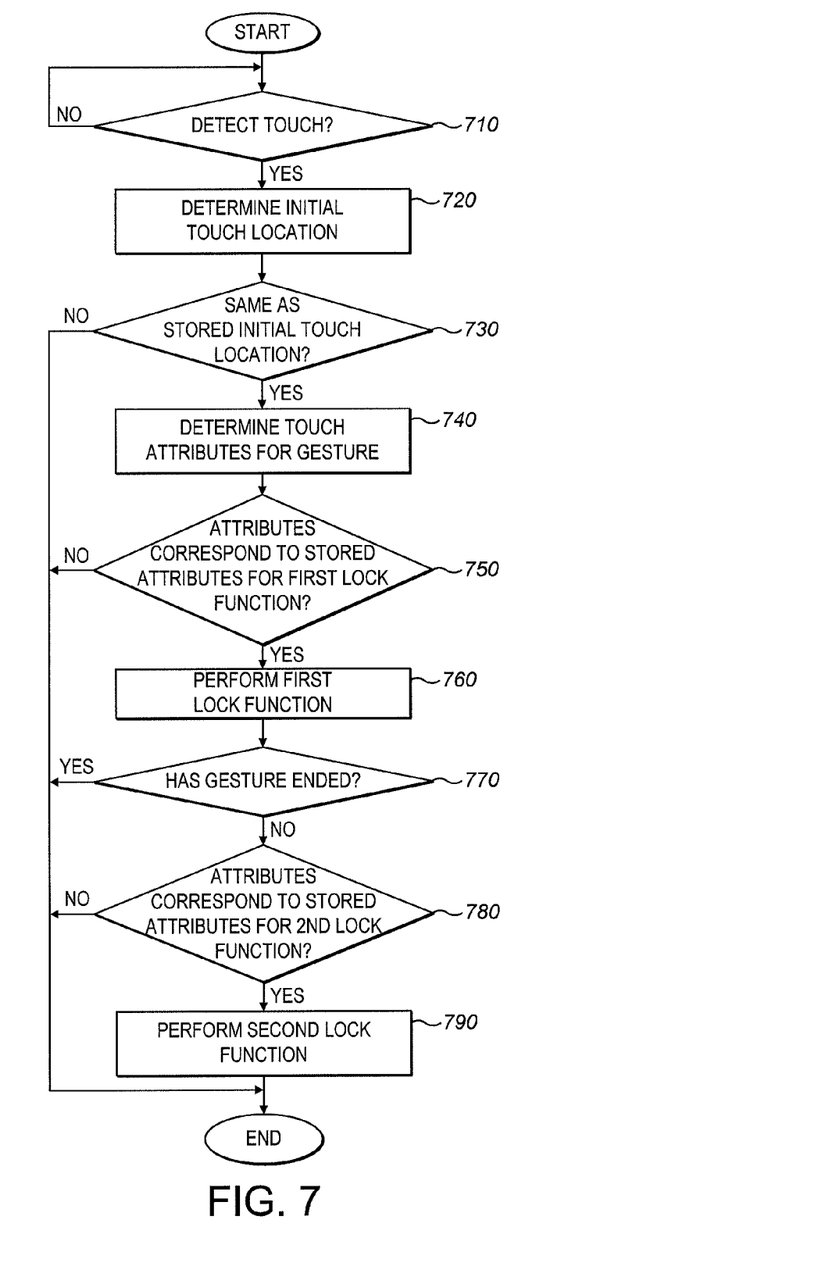
FIG. 7 is a flowchart illustrating a method of the disclosure.

A flowchart illustrating a method of detecting gestures associated with a lock function or functions is shown in FIG. 7. The method may be carried out by software executed, for example, by the processor 102. Coding of software for carrying out such a method is within the knowledge of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, which may be a non-transitory or tangible storage medium.

When a touch is detected 710 by the touch-sensitive display 118, touch data, including a touch location, is provided to the processor 102. For example, the touch location may be an x, y coordinate and may include additional touch information such as a time stamp, pressure information or other attributes obtainable from touch sensors 114. An initial touch location of a swipe gesture is determined 720 based on the received touch location. The touch location may be determined based on the raw touch input data or by establishing a virtual touch location, or a virtual touch area, based at least on the touch input data.

The initial touch location for the swipe gesture is compared 730 with a stored initial touch location for a locking function. Here, if the initial touch location does not correspond to the stored initial touch location for a locking function, then the process ends. If the detected initial touch location is the same as the stored initial touch location, then touch attributes are determined 740 for the gesture. The touch attributes determined at 740 are then compared 750 with stored touch attributes for a gesture corresponding to a lock function. This may be done after a delay, and/or repeated until either a gesture corresponding to a lock function is detected, or until a release of the gesture is detected. If the touch attributes for the gesture do not correspond to the stored touch attributes for a gesture associated with a lock function, then the process may end. However, if the touch attributes determined for the gesture do correspond to a stored gesture for the lock function, then the lock function is performed 760. It is then determined 770 whether the gesture has ended if this has not already been established. The gesture usually finishes with a release of the touch and so if the touch has been released, then the gesture is considered to have ended and the process ends. However, if the gesture has not ended and a touch is still detected, then the method may optionally compare 780 the gesture with a second set of touch attributes stored for a second gesture associated with a second lock function at 780. If the detected attributes correspond to stored attributes for a gesture associated with a second lock function, then the second lock function will be performed 790. If the detected attributes do not correspond to stored attributes for a gesture associated with the second lock function, then the process ends without performing a second lock function. Further instances of comparison step 780 and locking function performing step 790 may be included for further locking functions if desired. As set out above, it may be desirable to repeat steps 740 and 750 until either a release is detected or touch attributes corresponding to a lock function are detected, so that attributes of the gesture may be compared at multiple steps before ending the process. This may allow a sufficient number of iterations for the user to have described the gesture which is associated with a lock function before the process is ended. Alternatively or additionally, a delay may be provided between steps 730 and 740 so that a user has time to describe a suitable gesture before comparison step 750 is executed.

The implementation described is an illustrative example of one of many possible implementations envisioned by this disclosure. Other implementations may choose a different ordering, different weightings, and different combinations. Modifications to the examples may be made utilizing techniques to improve the efficiency and reduce computation or provide other advantages.

The present disclosure may be embodied in other specific forms without departing from its spirit or essential characteristics. The described examples are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

The invention claimed is:

1. A method comprising:
    receiving a swipe gesture from an initial touch location on a touch-sensitive display of an electronic device;
    determining touch attributes for the swipe gesture, the touch attributes comprising a touch location of the swipe gesture;
    performing a first lock function when the swipe gesture progresses to a first touch location on the touch-sensitive display that is beyond a first threshold from the initial touch location, wherein the first lock function locks a first set of functionalities of the electronic device; and
    performing a second lock function when the swipe gesture progresses to a second touch location on the touch-sensitive display that is beyond a second threshold from the initial touch location, wherein the second lock function locks a second, different set of functionalities of the electronic device and the second threshold is beyond the first threshold.

2. The method of claim 1, wherein the initial touch location is substantially at or substantially adjacent to an edge of the touch-sensitive display.

3. The method of claim 1, wherein the first lock function and the second lock function are associated with respective stored touch attributes each comprising a stored initial touch location, and wherein the initial touch location of the swipe gesture corresponds to the initial touch location stored for the first lock function and to the initial touch location stored for the second lock function.

4. The method of claim 3, further comprising:
    comparing the determined touch attributes to the touch attributes stored for the first lock function; and
    comparing the determined touch attributes to the touch attributes stored for the second lock function.

5. The method of claim 1, wherein at least one of the first and second thresholds is defined by a distance along an axis of the touch-sensitive display from the initial touch location.

6. The method of claim 1, wherein at least one of the first and second thresholds is defined by a distance along a path followed by the swipe gesture from the initial touch.

7. The method of claim 1, further comprising visually altering a graphical output of the touch-sensitive display as the swipe gesture proceeds, to provide a visual indication of the impending activation of the lock function.

8. The method of claim 1, wherein detecting a release of the swipe gesture activates the first lock function and the second lock function.

9. The method of claim 1, wherein the second lock function adds additional security to the first lock function.

10. The method of claim 9, wherein at least one of the first and second lock functions comprises at least one of: locking a service, locking an application, a device lock, a partial device lock, or a perimeter lock.

11. The method of claim 1, wherein the first threshold defines a swipe having a first length, and the second threshold defines a swipe having a second length longer than the first length.

12. The method of claim 1, wherein the first lock function comprises a screen lock.

13. The method of claim 1, wherein the second lock function comprises a device lock.

14. The method of claim 1, further comprising presenting a lock function indicator on the display if at least one stored swipe gesture is detected.

15. The method of claim 14, further comprising activating a lock function upon receiving a touch input at the lock function indicator.

16. An electronic device configured to perform a method comprising:
    receiving a swipe gesture from an initial touch location on a touch-sensitive display of an electronic device;

determining touch attributes for the swipe gesture, the touch attributes comprising a touch location of the swipe gesture;

performing a first lock function when the swipe gesture progresses to a first touch location on the touch-sensitive display that is beyond a first threshold from the initial touch location, wherein the first lock function locks a first set of functionalities of the electronic device; and performing a second lock function when the swipe gesture progresses to a second touch location on the touch-sensitive display that is beyond a second threshold from the initial touch location, wherein the second lock function locks a second, different set of functionalities of the electronic device and the second threshold is beyond the first threshold.

17. The electronic device of claim 16, wherein the initial touch location is substantially at or substantially adjacent to an edge of the touch-sensitive display.

18. The electronic device of claim 16, wherein the first lock function and the second lock function are associated with respective stored touch attributes each comprising a stored initial touch location, and wherein the initial touch location of the swipe gesture corresponds to the initial touch location stored for the first lock function and to the initial touch location stored for the second lock function.

19. The electronic device of claim 16, wherein the method further comprises:

comparing the determined touch attributes to the touch attributes stored for the first lock function; and comparing the determined touch attributes to the touch attributes stored for the second lock function.

20. The electronic device of claim 16, wherein at least one of the first and second thresholds is defined by a distance along an axis of the touch-sensitive display from the initial touch location.

21. The electronic device of claim 16, wherein at least one of the first and second thresholds is defined by a distance along a path followed by the swipe gesture from the initial touch location.

22. The electronic device of claim 16, wherein the method further comprises visually altering a graphical output of the touch-sensitive display as the swipe gesture proceeds, to provide a visual indication of the impending activation of the lock function.

23. The electronic device of claim 16, wherein detecting a release of the swipe gesture activates the first lock function and the second lock function.

24. The electronic device of claim 16, wherein the second lock function adds additional security to the first lock function.

25. The electronic device of claim 16, wherein the first threshold defines a swipe having a first length, and the second threshold defines a swipe having a second length longer than the first length.

26. The electronic device of claim 16, wherein the first lock function comprises a screen lock.

27. The electronic device of claim 16, wherein the second lock function comprises a device lock.

28. The electronic device of claim 16, wherein at least one of the first and second lock functions comprises at least one of: locking a service, locking an application, a device lock, a partial device lock, or a perimeter lock.

29. The electronic device of claim 16, wherein the method further comprises presenting a lock function indicator on the display if at least one stored swipe gesture is detected.

30. The electronic device of claim 29, further comprising activating a lock function upon receiving a touch input at the lock function indicator.

31. A non-transitory computer-readable storage medium having computer-readable code executable by at least one processor of a portable electronic device to perform operations comprising:

receiving a swipe gesture from an initial touch location on a touch-sensitive display of an electronic device;

determining touch attributes for the swipe gesture, the touch attributes comprising a touch location of the swipe gesture;

performing a first lock function when the swipe gesture progresses to a first touch location on the touch-sensitive display that is beyond a first threshold from the initial touch location, wherein the first lock function locks a first set of functionalities of the electronic device; and performing a second lock function when the swipe gesture progresses to a second touch location on the touch-sensitive display that is beyond a second threshold from the initial touch location, wherein the second lock function locks a second, different set of functionalities of the electronic device and the second threshold is beyond the first threshold.

32. The non-transitory computer-readable storage medium of claim 31, wherein the initial touch location is substantially at or substantially adjacent to an edge of the touch-sensitive display.

33. The non-transitory computer-readable storage medium of claim 31, wherein the first lock function and the second lock function are associated with respective stored touch attributes each comprising a stored initial touch location, and wherein the initial touch location of the swipe gesture corresponds to the initial touch location stored for the first lock function and to the initial touch location stored for the second lock function.

34. The non-transitory computer-readable storage medium of claim 33, wherein the operations further comprise:

comparing the determined touch attributes to the touch attributes stored for the first lock function; and comparing the determined touch attributes to the touch attributes stored for the second lock function.

35. The non-transitory computer-readable storage medium of claim 31, wherein at least one of the first and second thresholds is defined by a distance along an axis of the touch-sensitive display from the initial touch location.

36. The non-transitory computer-readable storage medium of claim 31, wherein at least one of the first and second thresholds is defined by a distance along a path followed by the swipe gesture from the initial touch.

37. The non-transitory computer-readable storage medium of claim 31, wherein the operations further comprise visually altering a graphical output of the touch-sensitive display as the swipe gesture proceeds, to provide a visual indication of the impending activation of the lock function.

38. The non-transitory computer-readable storage medium of claim 31, wherein detecting a release of the swipe gesture activates the first lock function and the second lock function.

39. The non-transitory computer-readable storage medium of claim 31, wherein the second lock function adds additional security to the first lock function.

40. The non-transitory computer-readable storage medium of claim 39, wherein at least one of the first and second lock functions comprises at least one of: locking a service, locking an application, a device lock, a partial device lock, or a perimeter lock.

41. The non-transitory computer-readable storage medium of claim 31, wherein the first threshold defines a swipe having a first length, and the second threshold defines a swipe having a second length longer than the first length.

42. The non-transitory computer-readable storage medium of claim 31, wherein the first lock function comprises a screen lock.

43. The non-transitory computer-readable storage medium of claim 31, wherein the second lock function comprises a device lock.

44. The non-transitory computer-readable storage medium of claim 31, wherein the operations further comprise presenting a lock function indicator on the display if at least one stored swipe gesture is detected.

45. The non-transitory computer-readable storage medium of claim 44, wherein the operations further comprise activating a lock function upon receiving a touch input at the lock function indicator.

* * * * *